United States Patent [19]

Hirzel

[11] Patent Number: 5,033,782
[45] Date of Patent: Jul. 23, 1991

[54] SHOVEL FOR LIFTING THE WEEDS AND SOFTENING THE GROUNDS

[76] Inventor: Suzy C. Hirzel, 933 Shellwood Way, Sacramento, Calif. 95831

[21] Appl. No.: 425,674

[22] Filed: Oct. 23, 1989

Related U.S. Application Data

[62] Division of Ser. No. 230,610, Aug. 10, 1988, abandoned.

[51] Int. Cl.$^5$ .............................................. A01D 9/00
[52] U.S. Cl. .................................................. 294/55.5
[58] Field of Search ........................ 30/169, 171, 172; 294/49, 51, 55.5; 171/104, 105; 172/21, 22

[56] References Cited

U.S. PATENT DOCUMENTS

| | | | |
|---|---|---|---|
| 1,263,949 | 4/1918 | Singer | 294/49 |
| 3,095,228 | 6/1963 | Duppengiesser | 294/49 |
| 4,326,743 | 4/1982 | Tamura | 294/55.5 |

Primary Examiner—Douglas D. Watts

[57] ABSTRACT

The Grass and Weed Lifting Shovel Head is comprised of shovel shaped head, having many spikes in the front, it looks like a giant fork. The spikes are spaced closely together, approximately ¼ to ½ apart to catch the weed in between the teeth.

1 Claim, 1 Drawing Sheet

SHOVEL FOR LIFTING THE WEEDS AND SOFTENING THE GROUNDS

This is a division of application Ser. No. 230,610, filed Aug. 10, 1988, now abandoned.

BACKGROUND OF THE INVENTION

1. Field of the Ivention

The present invention generally relates to a garden tool, and more particularly to an improved tool for digging or lifting the grass and weed withou cutting the roots, while leaving the soil on the ground.

2. Prior Art

Weeds are usually pulled by hand, dugout by shovel or killed with chemicals, which is dangerous around the vegetable garden. Grasses are removed by flat, or pointed shovels, or other machines. Most people like to use the hand to pull the weeds, however, the hand method is messy, and very hard to pull the big weeds, without breaking the roots. This means roots are still in the ground, and will grow back. People use rakes or other similar tools, but the space between the spikes are too far apart to grab the weeds. The regular shovel is nice for digging, because the shovel has a place to put the foot, for the purpose of pushing the shovel in the ground. But the regular shovel will cut the roots and lift the unnecessary dirt, because of this, user has to shake the grasses and weeds, to remove the excess soil. There are several small grass lifters, but the problem is, it takes lots of strength to push the lifter in the ground, because there is no place to put the foot to push the tool. If there are weeds in the well kept grasses, and you want to take only the weeds, by shovel, user will damage grass roots. When removing the grasses from small areas, people use existing shovels, this method is not satisfactory, because the broken grass roots are still in the ground, and will grow back again. Accordingly, there remains a need for an improved garden tool, that is capable of lifting the whole grasses and weeds, while leaving the soil on the ground.

SUMMARY OF THE INVENTION

The Grass and Weed Lifting Shovel Head of the present invention satisfies all the foregoing needs. The shovel is substantially set forth in the abstract. The Grass and Weed Lifting Shovel Head is comprised of hard and durable material such as metal, certain types of plastic and wood, in this case, applicant prefers metal. The shape of the Grass and Weed Lifting Shovel Head is same shape as existing, pointed or flat squared shovel, except it has spikes on the front, that are spaced closely together, approximately ¼ to ½ inch. The Grass and Weed Lifting Shovel is also good for breaking the soil, because spikes goes through the soils, making it soft and workable for seeding, etc. To use the Grass and Weed Lifting Shovel, exactly same as existing shovel, simply put one foot on the top edge of the shovel, and hold the handle, while pushing to the ground.

The Grass and Weed Lifting Shovel is simple, efficient, durable and easy to use. Further features of the present invention are set forth in the following detailed description and accompanying drawings.

DETAILED DESCRIPTION

FIGS. 1,2,3, AND 4

Figure 1:
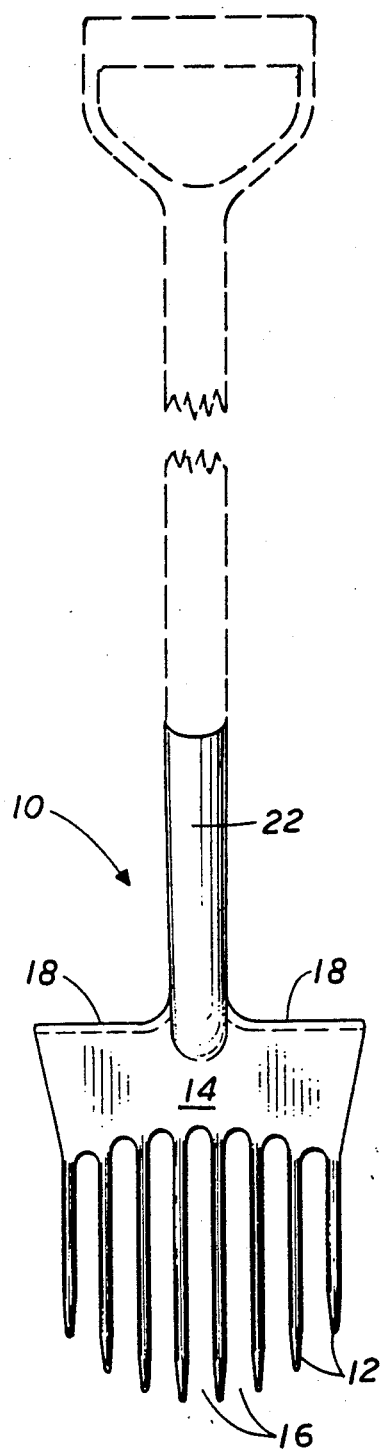
FIG. 1 is a plain view of the first embodiment of the Grass and Weed Lifting Shovel Head.
Figure 2:
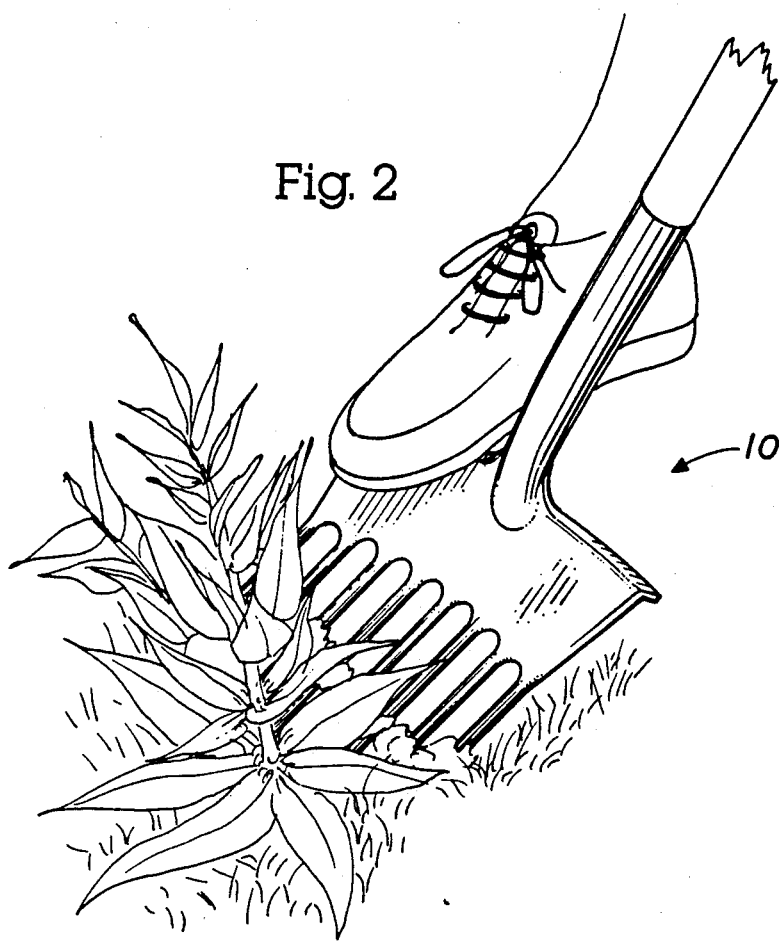
FIG. 2 is a view of the Grass and Weed Lifting Shovel in use, ready to dig-out the big weed.
Figure 3:
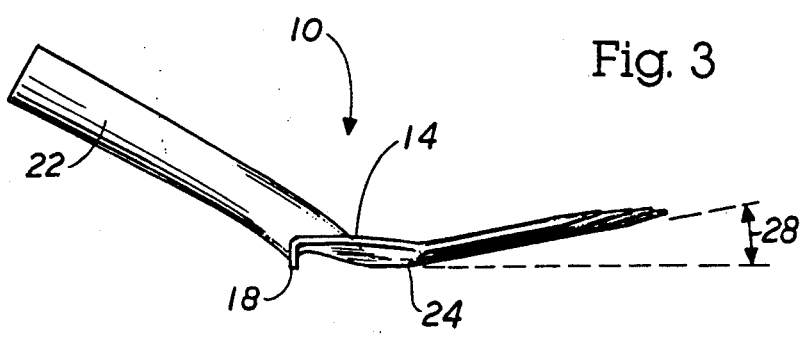
FIG. 3 is a view of weeds inside of the spikes, after being dugout by the Grass and Weed Lifting Shovel.

Referring more particularly to the accompanying drawings, a first preferred embodiment of the Grass and Weed lifting Shovel Head of the present invention is schematically depicted in FIGS. 1-4. Thus, shovel 10 is shown, which comprises of having many spikes 12 on the front part of the shovel. Between the spikes is space 16, which is approximately ¼ to ½ apart and spike 12 is approximately ¼ to ⅜ thick. Middle spikes are longer than side ones, to make shovel pointed. Spikes are connected to solid part 14, which is narrower in the center than on the sides. Flat edge 18 is for placing the foot 32, and for pushing the shovel. Weed 26 is being caught in-between spikes (FIG. 2). Shovel head 10 is made of hard and durable material, such as metal, wood, composite material, such as fiber glass and plastics.

FIG. 5

A second preferred embodiment of the 10a as shown in FIG. 5. Grass and Weed Lifting Shovel Head 10a is similar to shovel 10 and bear the same numerals, but are succeeded by the letter "a". Shovel 10a is identical to shovel 10 except as follows.

a) shovel is flat and not pointed front, which means, spikes are all same length.

Various modifications, changes, alterations and additions can be made in the Grass and Weed Lifting Shovel Head of the present invention, its components and their parameters. All such modifications, changes, alterations and additions are within the scope of the appended claims from part of the present invention.

What is claimed is:

1. A grass and weed lifting shovel comprising: a shovel head having a front and a back portion with at least five spikes in said front portion, said spikes being for insertion between roots to thereby hold grass and weeds, said spikes being spaced apart by approximately ¼" to ½", said spikes being longer in the central portion of said shovel than on the outside portions, said shovel further comprising a rear solid portion having a back edge adapted to be pushed by a foot, said solid portion extending for a shorter distance in the central portion of said shovel than in the outside portions.

* * * * *